Patented Oct. 8, 1929

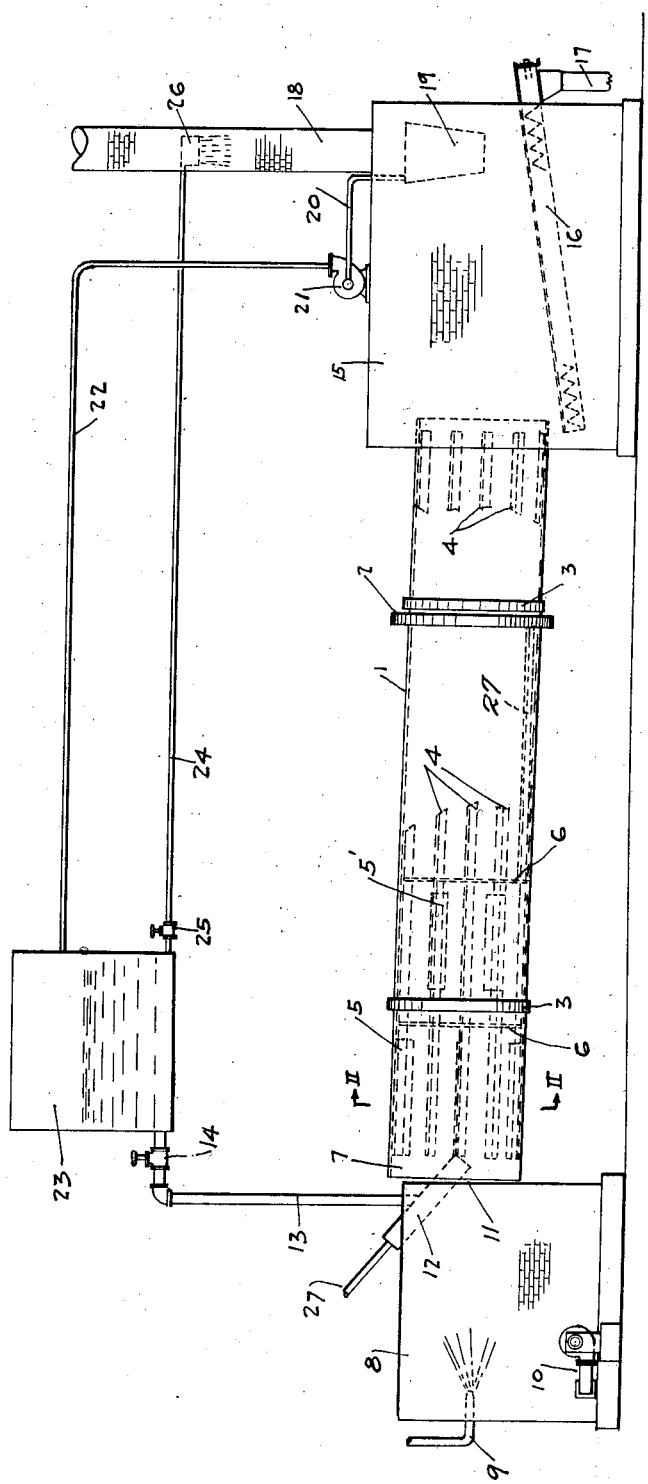
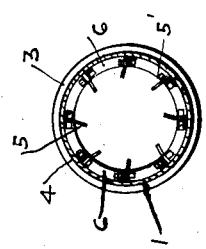
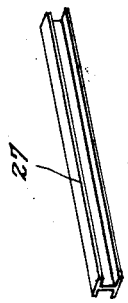
Oct. 8, 1929.    J. M. RUGH    1,730,902
METHOD OF AND MEANS FOR DRYING
Filed July 25, 1925
Fig 1
Fig 2
Fig. 3.
John M Rugh
INVENTOR.
BY A. C. Bierman
ATTORNEY.

1,730,902

UNITED STATES PATENT OFFICE

JOHN M. RUGH, OF ELIZABETH, NEW JERSEY, ASSIGNOR TO AMERICAN CYANAMID COMPANY, OF NEW YORK, N. Y., A CORPORATION OF MAINE

METHOD OF AND MEANS FOR DRYING

Application filed July 25, 1925. Serial No. 46,009.

This invention relates to drying, more particularly to the evaporation of a liquid, such as water, having a solid material dissolved or suspended therein, to dry the said material.

In certain chemical manufacturing operations there results a solution of a relatively easily decomposable material from which it is desired to recover the solids. For example, solutions of ammonium phosphate or calcium formate, although stable both in solution and in the solid state, are rather readily affected by heat, decomposing with the formation of worthless products. In evaporating solutions thereof care must be taken not to allow the material, as it is precipitated by reason of the evaporation of water, to become heated to a temperature much above the boiling point of water, otherwise decomposition occurs. I have found in practice that with the ordinary apparatus available, it was a difficult matter to prevent decomposition, especially during the later stages of the drying, when a large portion of the material is in the solid form and is without the protection afforded by the presence of water, which absorbs the heat applied and thus keeps the temperature down. I have also found that it is extremely difficult to prevent caking of material in the drying apparatus hitherto available, rendering it uneconomical to concentrate many materials because of the necessity of frequently stopping the evaporation and removing the caked material. The losses of material going out with the exit gases and vapors as well as in the caked material, were considerable.

My invention is intended to obviate these difficulties, it being among the objects thereof to devise a method of and means for drying materials which shall be simple and effective, which shall prevent undue losses thereof by decomposition and by being carried out with the exit gases, and which shall be continuous.

In practicing my invention I provide a dryer, consisting essentially of a horizontal, rotating cylinder, slightly inclined, through which the liquid to be evaporated is caused to flow and is kept in constant agitation so as to uniformly expose the same to the heating medium. Hot gases, generally products of combustion, are passed through the cylinder, entering the same at the upper end together with the stream of liquid to be evaporated. By this procedure the hot gases come in contact with the most dilute solution and they exert a maximum of evaporating effect thereon when there is no danger of decomposition of the solids taking place. The liquid and the gases pass in the same direction to the lower end of the cylinder, the gases becoming cooler as they approach the lower end and the liquid being evaporated so that at the coolest portion the gases are mixed with solid, dried material.

The products of combustion passing through an exit stack carry along therewith some of the dried material in the form of dust. In order to prevent loss thereof, I provide a spray in the stack, generally of liquid to be evaporated and scrub the gases, thereby removing all the dust suspended in the gases and at the same time causing some evaporation of water to take place. The scrubbing liquid may then be returned to the dryer to be evaporated as above set forth.

In the accompanying drawing, constituting a part hereof, and in which like reference characters indicate like parts;

Fig. 1 is a side elevational view of an apparatus adapted for the practice of my invention, and Fig. 2 is a sectional view through the drying cylinder, taken along the line II—II of Fig. 1.

Fig. 3 is a perspective view of a heavy member adapted to be periodically dropped within the drier to prevent caking of the material therein.

There is provided a horizontal cylinder 1, having a driving ring gear 2 secured thereto and meshing with a driving pinion, not shown. Bands 3 are secured to the cylinder at various points and rest upon rollers, not shown, all as is well-known in the art. Within the cylinder, and equally spaced around the circumference thereof, is a series of angle members 4 extending longitudinally through the entire length of the cylinder 1. Secured thereto in a staggered relation are several sets of baffles 5 and 5', and rings 6, constituting dams for the liquid to prevent the same from flowing to the lower end of the cylinder too rapidly, are interposed between the several sets of baffles. Generally the baffles do not extend further than from the upper end 7 of the cylinder to the middle thereof. A combustion chamber 8, provided with a source of liquid or gaseous fuel 9 and with a blower 10 to supply air or combustion, has an opening 11 leading into the upper end 7 of the rotary dryer. A pipe 12 of fire clay or similar material is adapted to receive liquid from pipe 13, having a shut-off valve 14.

At the lower end of cylinder 1 is a dust chamber 15 provided with a screw conveyor 16 to remove the material therefrom and deposit the same in hopper 17. Directly below the stack 18 for the exit gases is a receptacle 19, adapted to catch any liquid falling from the said stack, and a pipe 20 leading from the receptacle is connected to centrifugal pump 21 and allows the pumping of liquid from receptacle 19 by the pump 21 through pipe 22 and into the receiving tank 23. From the bottom of the said tank a pipe 24, controlled by valve 25, conducts liquid to a spray 26 in the stack 18.

The operation of my apparatus for the production of calcium formate, for example, is as follows:

Combustion is started in chamber 8 and the hot gases therefrom are caused to pass through cylinder 1, chamber 15 and stack 18. A relatively dilute solution of calcium formate is placed in the tank 23, which is preferably equipped with an agitator, valves 14 and 25 are opened causing the liquid to flow through pipe 13 and pipe 12 into the upper end of cylinder 1 and at the same time liquid flows or is pumped through pipe 24 and is showered down the stack by spray 26. The liquid entering the cylinder is caught by baffles 5 and 5' and is showered down through the gases of combustion, which pass through the cylinder in the same direction as the liquid. The dams 6 temporarily retain unevaporated liquid and prevent the same from flowing through the cylinder too rapidly. As the material approaches the lower end of the cylinder, the water is completely evaporated, leaving a solid material in the form of a fine powder. There is sometimes a tendency for the material, as it passes from the plastic to the dry state, to cake upon the walls of the cylinder and this is prevented by inserting through a suitable opening in the upper end thereof a heavy member, a generally in the form of an iron bar or angle or the like 27 which is slowly carried down through the cylinder by the rotation and inclination thereof, in its passage being raised by the angles 4 and baffles 5 and 5' and periodically dropped, giving blows to the interior of the cylinder and loosening any material that may become caked therein. The rate of feed is controlled so that the material is dry when it reaches the lower end.

The gases of combustion carrying some calcium formate dust pass upwardly through stack 18 and are met by a shower of calcium formate solution from spray 26 which removes the dust from the gases, the hot gases causing some evaporation of water from the solution, which is caught in receptacle 19 and is pumped therefrom by pump 21 and returned to tank 23 to be passed through the system, as above described, or it may be pumped directly into the dryer at the upper end thereof.

A similar procedure may be followed in the evaporation of solutions of other materials that are easily decomposable by excessive heat, and I may substitute for the calcium formate a solution of ammonium phosphate, which is evaporated in the same manner and the dust removed from the exit gases, as above described. However, it sometimes occurs that the exit gases in this case contain also some free ammonia due to the addition of too much ammonia to the material during the early stages of the manufacturing operation and it is desired to remove the same from the exit gases to minimize losses. To accomplish this the valve 14 is closed and tank 23 is filled with phosphoric acid solution, which is sprayed through the stack 18, not only scrubbing out the dust but also absorbing any ammonia in the gases, the solution being pumped back to the tank 23. After this solution has become sufficiently saturated with ammonia and ammonium phosphate, it is removed from tank 23 and is utilized in the manufacture of ammonium phosphate in the regular way. During the operation, solution for evaporation is supplied to the upper end of the cylinder 1 through pipe 27 from a tank, not shown.

Although I have described my invention, setting forth a single embodiment of the apparatus which I have devised and illustrating the operation thereof by two examples, my invention is not limited to the embodiment shown, nor the examples used, as it is apparent that various changes, both in the construction and in the materials operated upon may be made within the scope thereof. The general arrangement of the parts of the apparatus may be changed and the internal construction of the cylinder 1 may be different from that described, it being necessary only to provide some means for tumbling or spraying the liquid through the path of the gases in order to expose a large surface thereof to the hot gases. I may use a different source of heat, for instance, superheated steam may be used or waste hot gases from some other operation may be substituted for the oil or gas flame which I preferably use. The spray or sprays 26 may be of any type desired and the use of a pump for transferring liquids is not at all essential as various other means for so doing are well known in the art. In case the solution contains suspended solid material which affects the regulation of flow through valve 14, an air or steam lift, not shown, which withdraws the solution and suspended solids from the tank 23 and ejects it through pipe 13 or through an open trough into the drier, is used. The rate of feed is controlled by valves in the steam or air line at a point outside of the dust chamber 15, which is provided with a window through which the operator may observe the flow of the solution through the drier and may be guided in regulating the said valves. These and other changes may be made in my invention, the spirit and scope of which is set forth in the claims appended hereto.

What I claim is:

1. Apparatus for drying comprising an inclined, rotary drier, means for introducing the liquid to be dried at the upper end, longitudinally extending baffles in said drier for tumbling said liquid, and means for retarding the flow of liquid through the drier including a dam over which the liquid must spill.

2. Apparatus for drying comprising an inclined, rotary drier, means for introducing heating gases at the upper end thereof, a container for liquid to be dried, means for causing the same to flow into the upper end of said drier, and a heavy, free body disposed within said drier and means on the inner wall of the drier to engage said body on rotation of the drier and raise the same, said engaging means being formed to release said raised body to enable it to drop, and thus prevent the caking of material in the drier.

In testimony whereof, I have hereunto subscribed my name this 22nd day of July, 1925.

JOHN M. RUGH.